United States Patent
Takeda et al.

(10) Patent No.: US 9,443,316 B1
(45) Date of Patent: Sep. 13, 2016

(54) SEMI-AUTOMATIC IMAGE SEGMENTATION

(71) Applicant: SONY CORPORATION, Tokyo (JP)

(72) Inventors: Hiroyuki Takeda, San Jose, CA (US); Mohammad Gharavi-Alkhansari, San Jose, CA (US)

(73) Assignee: SONY CORPORATION, Tokyo (JP)

( * ) Notice: Subject to any disclaimer, the term of this patent is extended or adjusted under 35 U.S.C. 154(b) by 0 days.

(21) Appl. No.: 14/804,433

(22) Filed: Jul. 21, 2015

(51) Int. Cl.
| | |
|---|---|
| G06K 9/34 | (2006.01) |
| G06T 7/00 | (2006.01) |
| G06T 3/40 | (2006.01) |
| G06K 9/62 | (2006.01) |
| G06F 3/0484 | (2013.01) |

(52) U.S. Cl.
CPC ......... *G06T 7/0081* (2013.01); *G06F 3/04842* (2013.01); *G06K 9/6267* (2013.01); *G06T 3/40* (2013.01); *G06T 2207/10004* (2013.01); *G06T 2207/10024* (2013.01)

(58) Field of Classification Search
None
See application file for complete search history.

(56) References Cited

U.S. PATENT DOCUMENTS

| | | | |
|---|---|---|---|
| 7,203,360 B2 | 4/2007 | Lee et al. | |
| 7,813,528 B2 * | 10/2010 | Porikli | G06K 9/00771 348/155 |
| 7,876,947 B2 | 1/2011 | Lee et al. | |
| 2014/0111662 A1 * | 4/2014 | Mashiah | G06T 13/80 348/220.1 |

FOREIGN PATENT DOCUMENTS

WO   2013/175228 A1   11/2013

OTHER PUBLICATIONS

Geman et al.; "Stochastic relaxation, Gibbs distributions, and the Bayesian restoration of images"; Nov. 1984; IEEE Transactions on pattern analysis and machine intelligence, vol. PAMI-6, No. 6; pp. 721-741.*
Carson et al.; "Blobworld: Image segmentation using expectation-maximization and its application to image querying"; Aug. 2002; IEEE Transactions on pattern analysis and machine intelligence, vol. 24, No. 8; pp. 1026-1038.*
Wang, Tinghuai et al., "Touchcut: Single-Touch Object Segmentation Drive by Level Set Methods", Sony China Research Laboratory, University of Surrey, 2012, pp. 1-4, (published before this application Aug. 2015).

* cited by examiner

*Primary Examiner* — Eueng-Nan Yeh
(74) *Attorney, Agent, or Firm* — O'Banion & Ritchey LLP; John P. O'Banion

(57) ABSTRACT

Semi-automatic (instant) color image segmentation is performed on an input image for an object located near the point given by the user (e.g., touch screen contact). The size, shape, and the number of colors of the target object which is about (lying around or surrounding) the user-selected point is determined, and determinations made for which region the pixels belong to, either foreground or background. A binary object mask is generated which can be utilized for removing the material surrounding that object, or inverting the mask to remove the material of the object.

28 Claims, 8 Drawing Sheets

SEMI-AUTOMATIC IMAGE SEGMENTATION

CROSS-REFERENCE TO RELATED APPLICATIONS

Not Applicable

STATEMENT REGARDING FEDERALLY SPONSORED RESEARCH OR DEVELOPMENT

Not Applicable

INCORPORATION-BY-REFERENCE OF COMPUTER PROGRAM APPENDIX

Not Applicable

NOTICE OF MATERIAL SUBJECT TO COPYRIGHT PROTECTION

A portion of the material in this patent document is subject to copyright protection under the copyright laws of the United States and of other countries. The owner of the copyright rights has no objection to the facsimile reproduction by anyone of the patent document or the patent disclosure, as it appears in the United States Patent and Trademark Office publicly available file or records, but otherwise reserves all copyright rights whatsoever. The copyright owner does not hereby waive any of its rights to have this patent document maintained in secrecy, including without limitation its rights pursuant to 37 C.F.R. §1.14.

BACKGROUND

1. Technological Field

This invention pertains generally to image processing, and more particularly to semi-automatic color image segmentation.

2. Background Discussion

Image segmentation is a process of partitioning a color image into regions. The simplest case involves separating a foreground object having known properties from the background.

Different approaches have been attempted for segmenting the image area of an object from its surroundings. The simplest approach is perhaps that based on thresholding. For instance, given the user-selected point, the segmented object would be the collection of the adjacent pixels having similar color values to the color value (the centroid) at the user-selected point in a certain range. This method functions for only single-colored objects, otherwise the user will be required to select multiple centroid values, and select color ranges manually for segmentation of the multi-colored objects, to get all elements of the object selected.

A 'grab-cut' approach is another color image segmentation method, which is a modified version of the 'graph-cuts' method for gray-scale image segmentation, where the gray ranges for the two classes, foreground and background, are automatically chosen by variance of the foreground or background pixels. In grab-cut, each foreground or background class is further split into several sub-classes to deal with multi-colored objects. Each sub-class is represented by the centroid color value and the co-variance matrix, due to the vector valued pixel (i.e., red, green, and blue). In the classical sense, such a model is referred to as a mixture model.

Often, the probability density function of the color pixels is approximated by a weighted linear combination of Gaussian functions parameterized with the centroids and the covariance matrices, and it is then called Gaussian mixture model (GMM). Using GMM, an unlabeled pixel is classified into the nearest classes where the distance between the unlabeled pixel and each class is computed with the centroid and covariance matrix. The approach is nothing but the classical Bayes classifier. The novelty of grab-cut is the correction term (or the smoothness term) for the distance measure. An analysis of the local gradients around the unlabeled pixel is taken into account, and that is the one reason why grab-cut performs better than the threshold approach. However, grab-cut requires the user to input a box around the object of interest. This box in fact provides not only the object's position but also the rough size. Further user inputs are required for minor correction of the segmented object.

However, as has been described above, proper image segmentation typically involves considerable user input for arriving at a proper segmentation results.

Accordingly, a need exists for an image segmentation method which is sufficiently accurate to allow semi-automatic image segmentation, while overcoming shortcomings of prior segmentation methods.

BRIEF SUMMARY

In the present disclosure, a color image is received with the goal of semi-automatically (instantly) segmenting an object located near the point given by the user. Previous approaches are inadequate, in terms of the robustness, computational complexity due to the smoothness term, and the simplicity of the user-inputs, for performing this level of semi-automatic segmentation.

FIG. 1A to FIG. 1B illustrate an example embodiment of semi-automatic image segmentation. In FIG. 1A the user is shown selecting an object within the image. It should be appreciated, that although a touch input is illustrated, other user selection inputs can be similarly utilized, including but not limited to touch input (contact and non-contact), cursor movement to the object, and similar means for pointing to a particular location within an image, about which the object to be segmented is ostensibly located. Upon pointing within an image object, the pixels associated with that object are automatically segmented to that which is seen in FIG. 1B. It should be appreciated that the example illustrates segmenting the object by itself (discarding the background), while alternatively, the object can be removed from the remainder of the image, or segmentation utilized in another manner without departing from the teachings of the present disclosure.

No additional user-inputs are required for accurately performing this segmentation process. The disclosed method, therefore, is configured for semi-automatically estimating size, shape, and the number of colors of the target object which is about (lying around or surrounding) the user-selected point. Once the segmentation is started, the method decides which region the pixels belong to, either the foreground or the background, by itself. The user selection is the only non-automated portion of the described process, although other steps could be less-preferably added (e.g., parameter selection, verification step, selecting object of segmentation, etc.) without departing from the teachings of the present invention. The disclosure presents a general framework of a semi-automatic image segmentation system.

Further aspects of the invention will be brought out in the following portions of the specification, wherein the detailed description is for the purpose of fully disclosing preferred embodiments of the invention without placing limitations thereon.

BRIEF DESCRIPTION OF THE SEVERAL VIEWS OF THE DRAWING(S)

The invention will be more fully understood by reference to the following drawings which are for illustrative purposes only:

DETAILED DESCRIPTION

1. Introduction

Figure 1A:
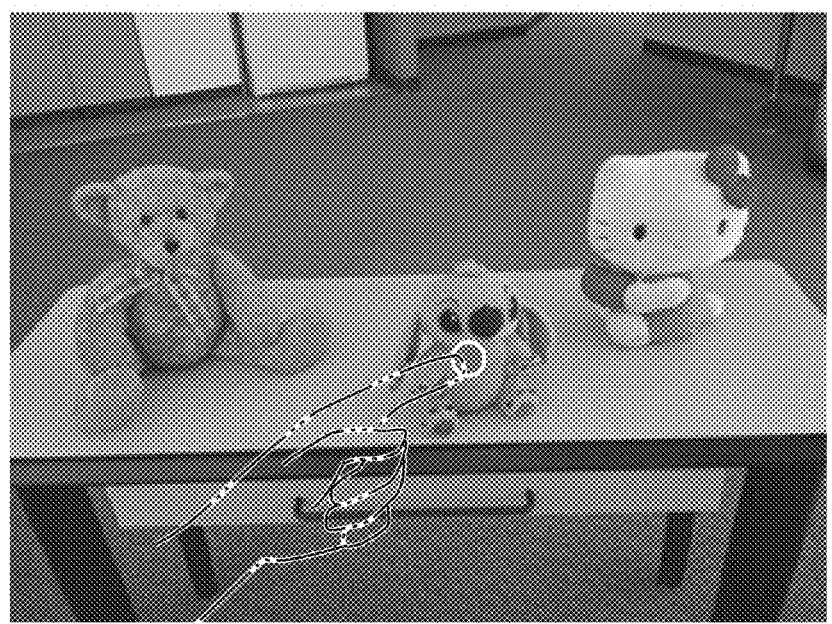
FIG. 1A and FIG. 1B are images showing user selection of an object (FIG. 1A) and the selected object segmented from its surroundings (FIG. 1B) as performed according to an embodiment of the present disclosure.
Figure 1B:

The present disclosure (system/method/apparatus) utilizes a number of elements of saliency detection by color histogram contrast to overcome the problems found in the background art of segmentation.

1.1. Semi-Automatic Segmentation

The disclosure is configured for considering two type of objects: known objects exemplified herein as human-objects, and unknown objects exemplified herein as non-human objects. Two different but similar methods are utilized for these different object types.

1.2 EM Method

The single-touch segmentation problem is challenging, in particular in that important information, including the object's size and shape, number of colors, (i.e., the class parameters) is not provided to the system, such as in response to user input. The classification problem without the class information (parameters) is referred to as an unsupervised classification problem. In solving the segmentation problem, the system is configured to classify the pixels and estimate the class parameters at the same time. One approach for solving the problem is called an expectation-maximization (EM) algorithm. This is utilized for the present disclosure to estimate class parameters and the object mask using a joint Bayes classifier according to an embodiment of the present disclosure.

1.3 Multi-Scale Scheme

In order to improve the stability of the segmentation process and reduce computational cost, a multi-scale scheme is relied upon. In this multi-scale process the mask is estimated at a coarse resolution and then gradually refined at the finer resolution. Examples are given for downscaling to one-sixteenth ($\frac{1}{16}$) resolution, while embodiments of the present disclosure also are configured to downscale an input image to one-sixty-forth ($\frac{1}{64}$) resolution. It should be appreciated that the present disclosure can utilize downscaling to any practical level without departing from the teachings of the present disclosure.

1.4 Discerning Known Objects

Before performing the actual segmentation, the system performs a known object detection process, exemplified herein for human objects with a face detection process (method) to find any faces that may be present in the given image. Using the detected faces, the associated human objects are pre-segmented. Then it is determined if the user-selected point is within the region of any of the human objects. If the selection point is within one of these human objects, then the object mask is initialized using pre-segmented results, and the object mask is then refined at the finer resolution. In at least one embodiment of the disclosure a process of pedestrian (full-body human) detection or other object detection methods can be utilized for identifying specific objects' locations and sizes. It should be appreciated that the face detection process is only an example, while one of ordinary skill in the art will appreciate that other forms of object detection are available and can be similarly utilized without departing from the present disclosure, including but not limited to vehicle detection, pedestrian (full-body human), and so forth.

1.5 Discerning Unknown Objects

For unknown objects, the method first searches the best size of a circular initial mask by a binary search method, with some stopping criteria set in the segmentation process. Only when the EM method converges, the segmentation successfully ends. Based on how the segmentation process ends, an optimal size of the initial mask is determined.

2. Technical Details and Embodiments

Figure 2A:
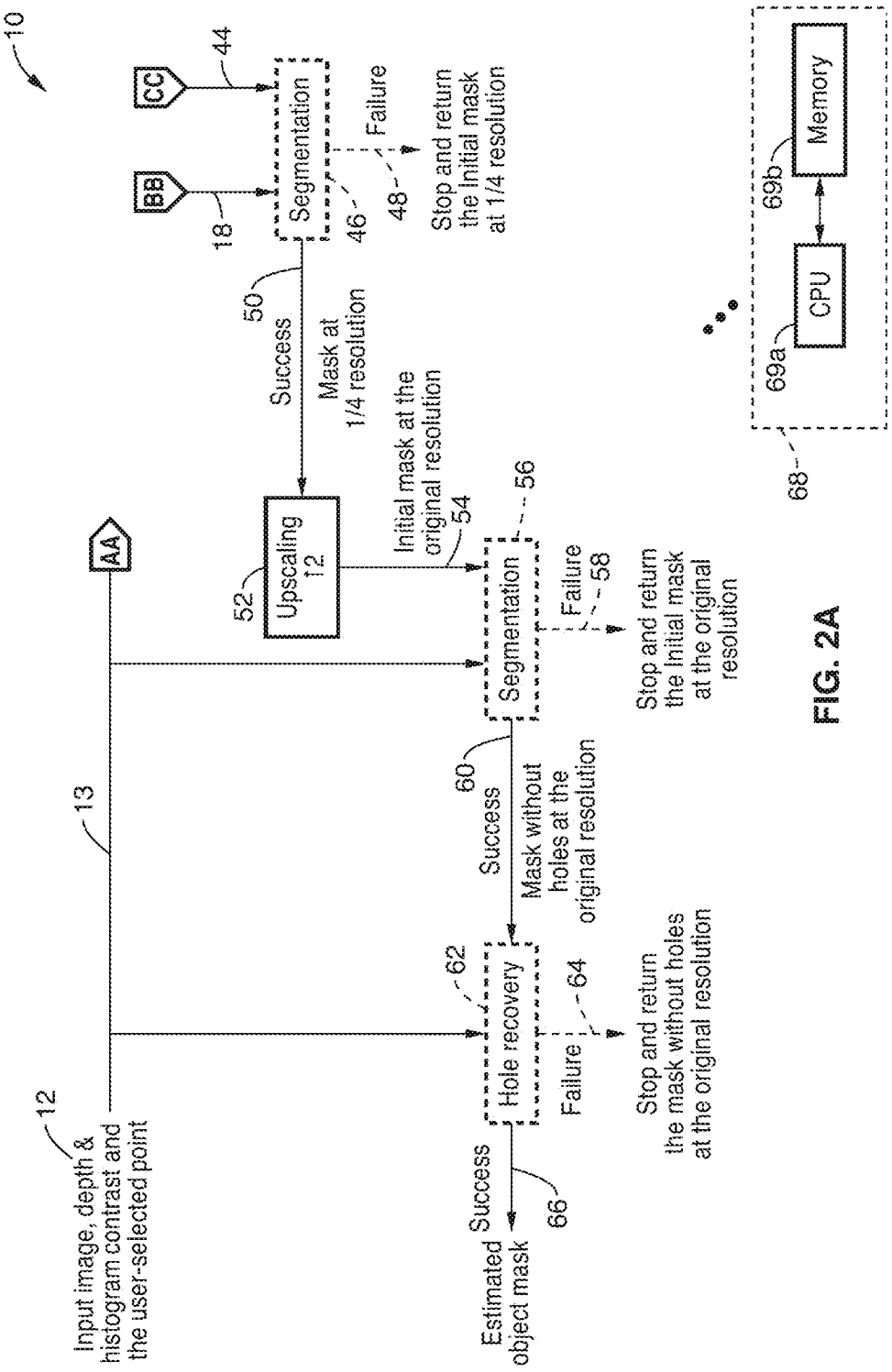
FIG. 2A and FIG. 2B is a flow diagram of semi-automatic segmentation according to an embodiment of the present disclosure.
Figure 2B:
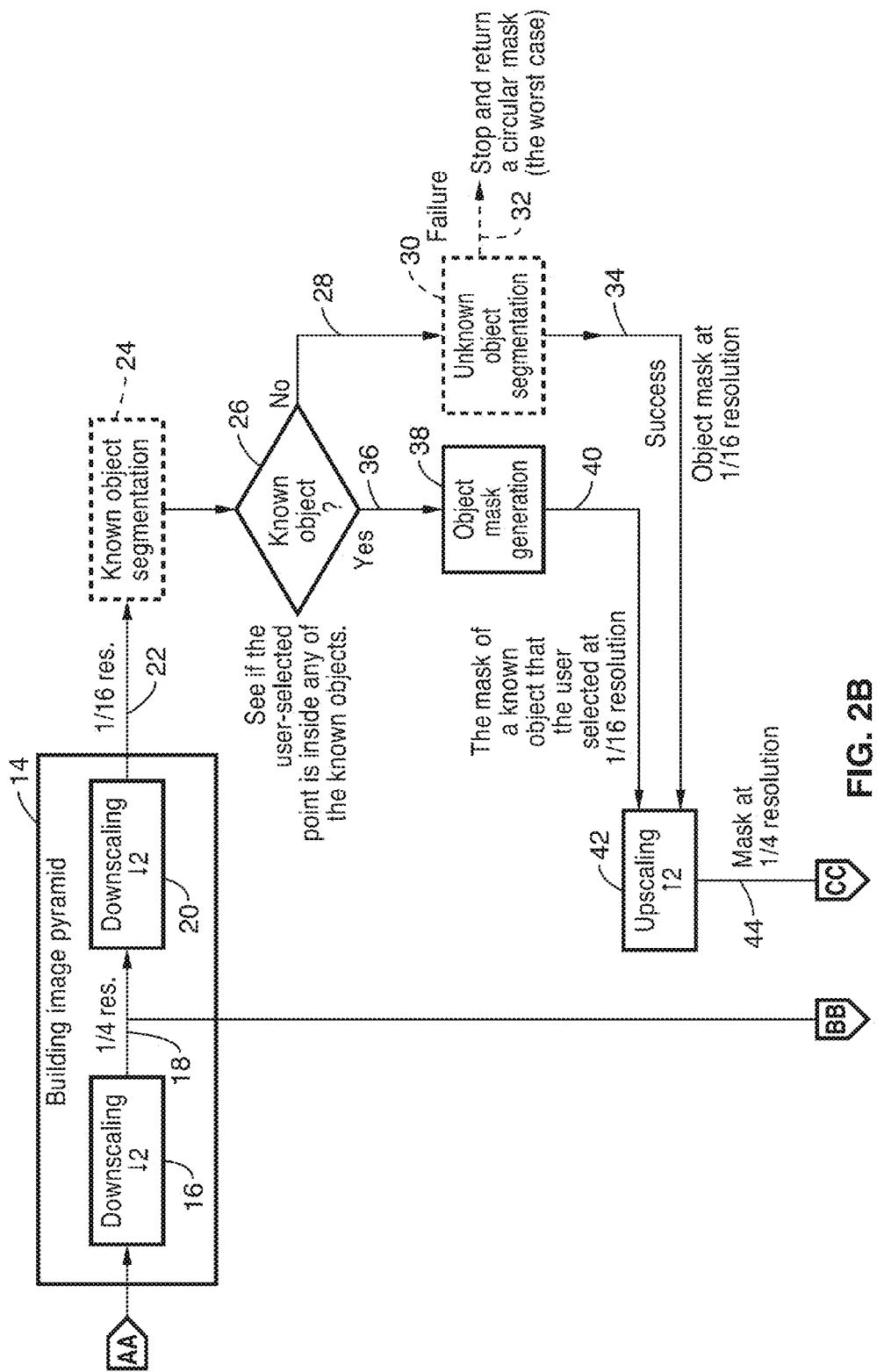
Figure 4:
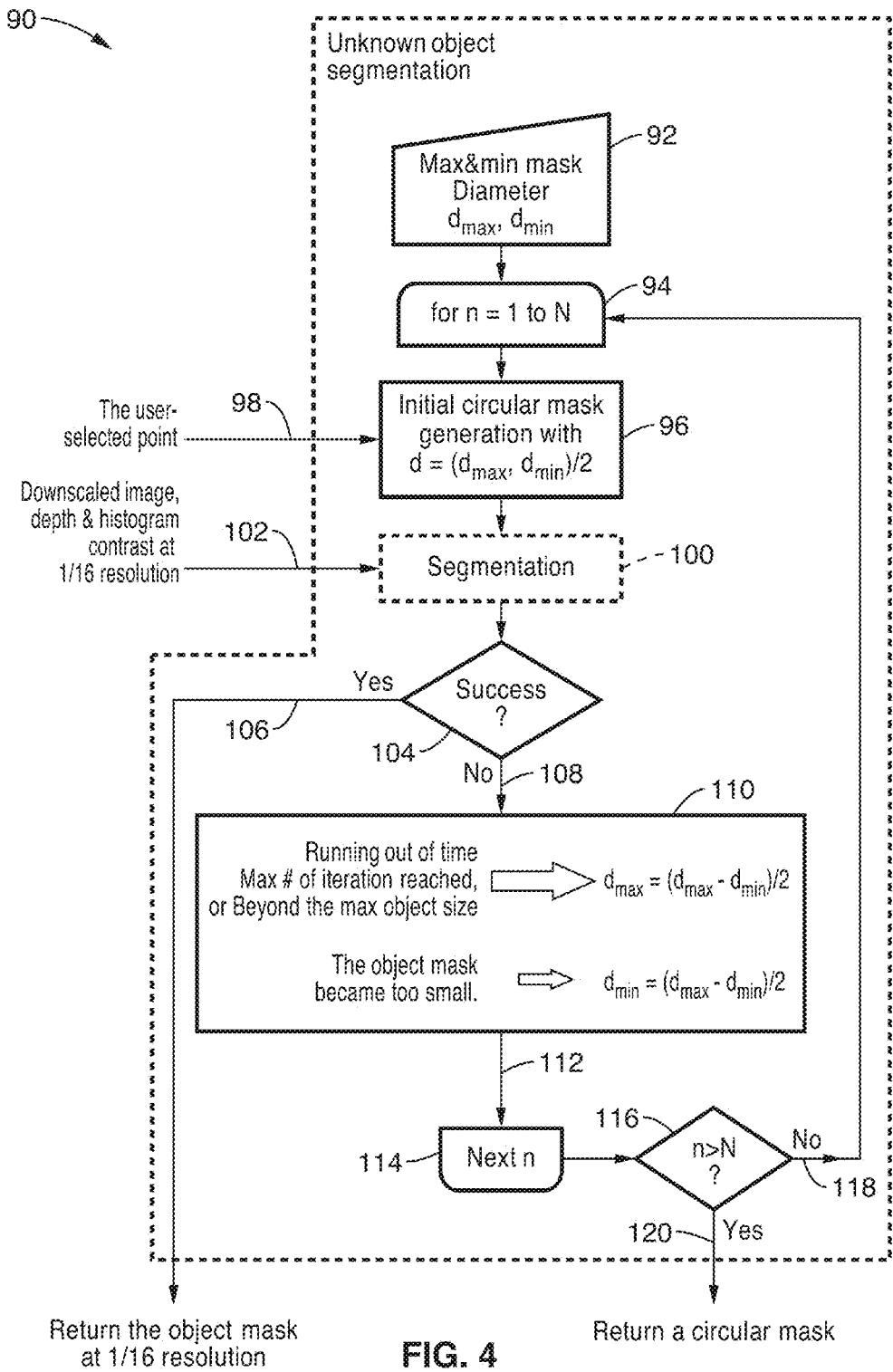
FIG. 4 is a flow diagram of semi-automatic unknown object segmentation according to an embodiment of the present disclosure.

FIG. 2A through FIG. 2B illustrate an example embodiment 10 of a semi-automatic segmentation process according to present disclosure. Original input data 12 is received, such as a color image, with preferably its depth map and histogram contrast, and the user-selected point (x, y image coordinate) which is provided 13 for image pyramid building 14, which performs multiple stages of image downsampling. A first downsampling 16 is performed and outputs 18 an image at a lower resolution, such as exemplified as being one-fourth ($\frac{1}{4}$) the original resolution, that is to say a reduction of one-half ($\frac{1}{2}$) resolution in each of the horizontal and vertical directions. A second downsampling is then performed 20 to output 22 even a lower resolution, here shown as one-sixteenth ($\frac{1}{16}$) the original image resolution. In certain embodiments, the image may be downsampled to a greater extent, either by increasing the amount of downsampling per stage, or increasing the number of downsampling stages. Increased levels of downsampling are particularly useful when the input image has a very high pixel count (e.g., high resolution or large image size). Known object segmentation 24 is performed on the downscaled image. This segmentation is a pre-segmentation of known objects, exemplified herein considering human objects. The pre-segmentation results are stored in memory, in case the user selects a different location of the image in a subsequent segmentation decision. A determination is made 26 if the user selected point is inside any of the known objects. If yes 36, then object mask generation 38 is performed in which the segmentation mask of the user-selected object is picked up from the pre-segmented results, and an object mask generated 40. If the object is not a known object 28 (user selected (e.g., touched) an object of unknown type), then an unknown object segmentation process 30 is performed, as shown in FIG. 4. If unknown object segmentation fails 32, then a default mask is returned, such as a circular mask surrounding a given area about the point of user selection. Otherwise an object mask is generated 34 for the unknown object. The object mask, whether for a known or unknown object, is then upscaled 42, such as by the nearest neighbor method, to output a mask 44. It should be noted that the mask is still at a lowered resolution, such as at one-quarter (¼) resolution according to this example.

Then segmentation is performed 46 at a finer image resolution taking the object mask 44, and the reduced resolution image 18. At this stage, the system already has a good mask estimated at the lower image resolution. The method then refines the upscaled object mask using the same segmentation method, such as described in FIG. 5. If a failure arises 48 during this segmentation, then the segmentation process is stopped and the upscaled valid mask is returned as the final result. Otherwise, for successful segmentation a mask is output 50, such as at this lowered resolution, seen here as one-quarter (¼) resolution. Upscaling 52 is then performed on the successful object mask, to generate an initial mask 54 at the original resolution. It should be appreciated that in general, this segmentation and upscaling process is repeated as many times as the image was downsampled. Segmentation is then performed 56 at the original image resolution. If a failure is detected 58, then the segmentation process is stopped and the upscaled valid mask is returned as the final result. Successful segmentation generates a mask 60 without holes at the original resolution, to be received by a hole recovery process 62. If hole recovery fails 64 then the process is stopped and the mask is returned without holes at the original resolution. At last, the hole recovery process is applied to the estimated object mask to recover the object's hole, such as using the method described in FIG. 6, to output an estimated object mask 66.

It should be appreciated that the disclosed system/apparatus/method, seen in this figure and the other figures, involves the use of image processing which is preferably carried out by computer processing 68, such as including at least one processor 69a coupled to at least one memory 69b for storing instructions, that when executed by the processor perform the imaging processing steps described throughout the text and figures of this disclosure. For the sake of simplicity of illustration, the processing block is not shown in each figure.

Figure 3:
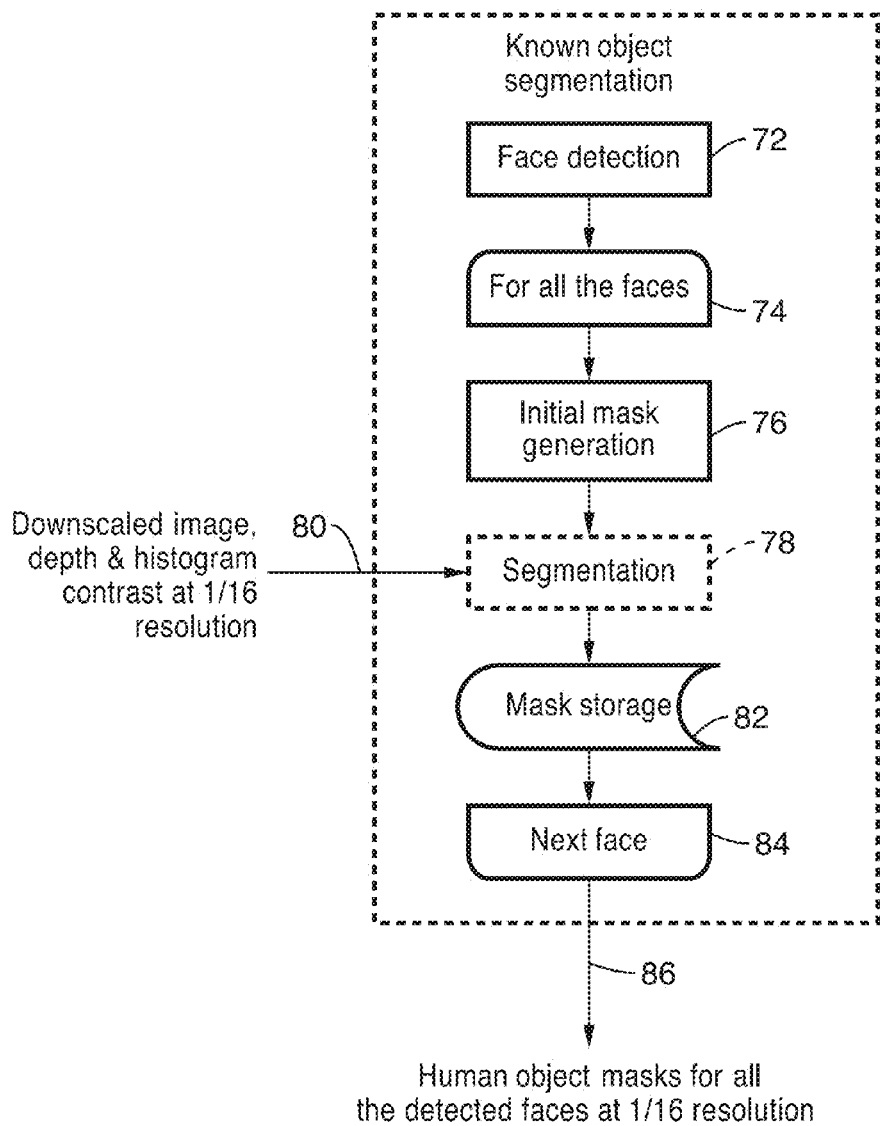
FIG. 3 is a flow diagram of semi-automatic known object segmentation according to an embodiment of the present disclosure.

FIG. 3 illustrates an example embodiment 70 of known object segmentation according to the present disclosure. Rough human object segmentation is performed by first finding any face locations and their rough sizes by a face detection process 72. For each of these faces 74, an initial mask is generated 76, such as by drawing a boundary (e.g., rectangle) for the possible hair part around the face, and another boundary (e.g., rectangle) around the hair boundary for the initial background region, and then starting segmentation 78 with the face and hair boundaries as the initial foreground region. This initial segmentation 78 is preferably configured for utilizing a downscaled image, depth and histogram contrast 80. By way of example, a resolution of ¹⁄₁₆ of the original can be utilized. Then the human object mask is stored 82. The loop continues with the next face 84, and returns back to block 76 for more human object segmentation until all initial segmentation of human objects associated with each of the detected faces has been performed. It should be appreciated that various approaches may be utilized separately or in any desired combination in discerning the known objects exemplified herein as human objects. Once this process is completed, then estimated human object masks are returned 86.

The depth map and histogram contrast map are provided by separate applications which are not the subject of this patent application. The depth map estimates may be obtained for example from a series of images captured with different focus settings. The histogram contrast map is computed prior to the segmentation process.

The segmentation process can be regarded as a classification of pixels into foreground or background. In the disclosed segmentation, in addition to utilizing pixel color values (e.g., red, green, blue), a vector X is formed including depth and histogram contrast for each pixel, as X=[Red, Green, Blue, Depth, Histogram contrast]. In response, the foreground is segmented out by classifying the 5×1 vectors.

FIG. 4 illustrates an example embodiment 90 of unknown object segmentation according to the present disclosure. The process is performed in response to a binary search of an optimal initial mask size. Minimum and maximum mask diameters, $d_{min}$ and $d_{max}$, are initialized 92 for a maximum number 94 of iterations N for the binary search algorithm.

An initial circular object mask is generated 96 with the diameter $d=(d_{max}-d_{min})/2$ set around the user-selected point 98, to which is added the background region from the previous trial. In a first pass, a slightly larger circle is selected around the foreground region for the initial background. The segmentation process 100 commences with downscaled image, depth and histogram contrast 102 (e.g., ¹⁄₁₆ resolution). A determination is made if the segmentation is successful 104. If segmentation ended successfully, then the process is stopped with the search returning the estimated object mask 106. Otherwise, processing 110 is performed for a failed segmentation 108. If segmentation failed because the time ran out, or because the maximum number of iterations was reached in the segmentation function, or because the object mask size was beyond the max size, then 110 $d_{max}$ is updated by d, such as $d_{max}=(d_{max}-d_{min})/2$. Or if segmentation failed because the object size became too small, then $d_{min}$ is updated by d, such as $d_{min}=(d_{max}-d_{min})/2$, with a circular mask output 112, and a next n selected 114 and checked for loop threshold (n>N) 116. If N has not been reached 118, a return is made to block 94. Otherwise, with n>N a circular mask is returned 120 with diameter d.

Figure 5:
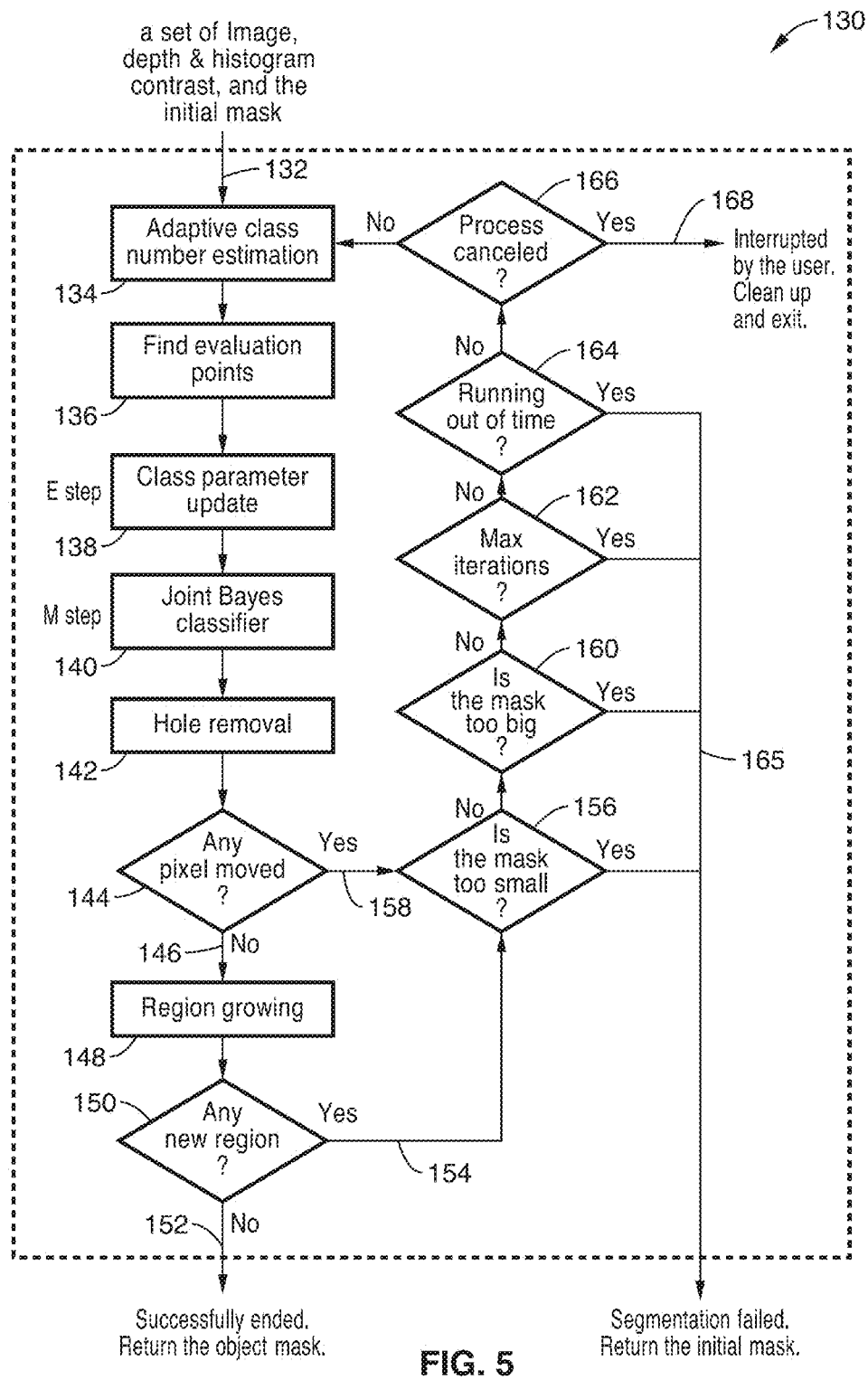
FIG. 5 is a flow diagram of semi-automatic segmentation using expectation-maximization (EM) according to an embodiment of the present disclosure.

FIG. 5 illustrates an example embodiment 130 of segmentation using expectation-maximization (EM) according to the present disclosure. Given information 132 including an image, its depth, histogram contrast, and its initial mask, this method first estimates 134 an optimal class number for each foreground or background based on the mean square errors, and quantizes the foreground or background pixels by a simple quantizer (e.g., the minimum variance classifier) to generate initial classes for the foreground and/or background regions. It will be noted that the input image is captured by an image capture device, such as a camera or mobile device of a user. The depth map is estimated by a separate application which runs on either the camera or the mobile device, as are known in the art.

Evaluation points are then found 136 in the image, with the method only evaluating points located near the foreground-background boundary to reduce computational cost. The class parameters are then updated (or generated) 138 based on the current classes (E-step), followed by evaluating the pixels using a joint Bayes classifier according to the disclosure and classifying 140 the pixels at the evaluation points (M-step). Then the holes are removed 142 from within the foreground region. A determination is made 144 if any pixels have been moved. If no pixels are moved 146 between the foreground classes to the background classes, the unlabeled pixels are added 148 next to the foreground pixels, before proceeding to step 150. Otherwise execution path 158 is followed if pixels have moved. A determination 150 is made if new regions were added. If no new regions added, then the segmentation has completed successfully, and the object mask is returned 152, otherwise there is a new region 154.

If any pixels were moved, or any new regions added, then stopping criteria are evaluated. The stopping criterion are checked in sequence, including a determination 156 if the mask is too small, a determination 160 if the mask is too big, a determination 162 if the maximum iterations have been reached, a determination 164 if a run time value has been reached. If any of those stopping conditions are met, then a return 165 is made indicating that segmentation failed while returning the initial segmentation mask, and in at least one preferred embodiment also returning the cause of the segmentation failure. It should be appreciated that returning the cause of segmentation failure is used for the binary search of the initial object size. If none of the stop conditions are met, then block 166 is executed to determine if the process was canceled/interrupted by the user. If the process was canceled by the user, then a clean up and exit 168 are performed, otherwise another segmentation attempt is made proceeding to step 134.

Figure 6:
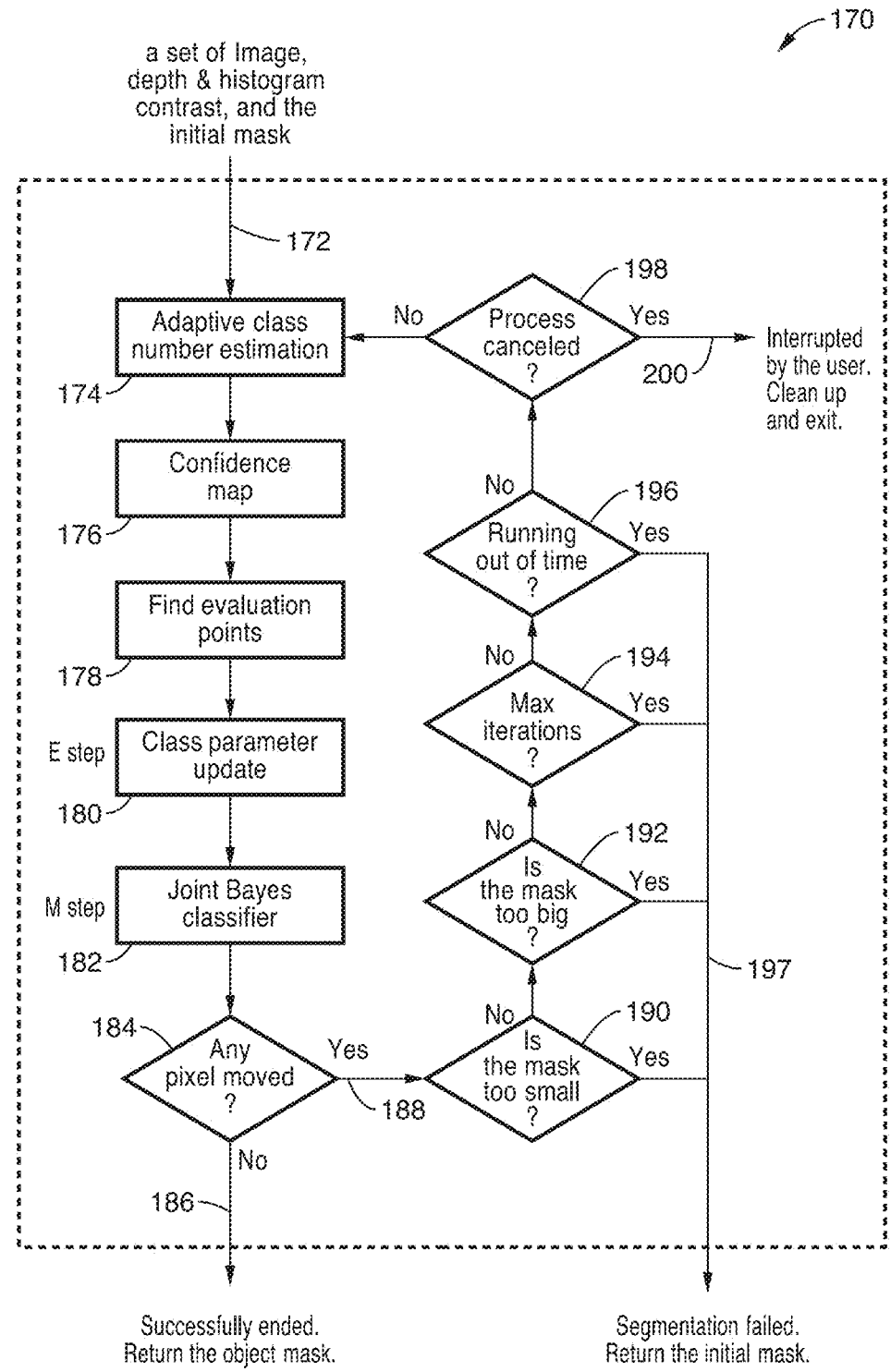
FIG. 6 is a flow diagram of hole recovery during semi-automatic image segmentation according to an embodiment of the present disclosure.

FIG. 6 illustrates an example embodiment 170 of hole recovery with the expectation-maximization (EM) method according to the present disclosure. Given information 172 including an image, its depth, histogram contrast, and its initial mask, this method first estimates 174 an optimal adaptive class number for each foreground or background based on the mean square errors, and quantize the foreground or background pixels by a simple quantizer (e.g., the minimum variance classifier) to generate initial classes for these foreground or background regions. A confidence map is generated 176 which indicates how close the foreground pixels are to the closest background class. Evaluation points are then found 178. It will be noted that this embodiment only evaluates foreground pixels with low confidence values. Then updating (or generation) of class parameters is performed 180 based on the current classes (E-step). Pixels are then evaluated 182 using a joint Bayes classifier which classifies 182 the pixels at the evaluation points (M-step). It should be appreciated that the joint Bayes classifier is a separate application and not the subject of this application.

A determination is made 184 if any pixels have moved. If no pixels moved between the foreground classes to the background classes, then segmentation successfully ended 186 with the estimated object mask being returned. Otherwise, if any pixels have moved 188, then a number of stopping criterion are evaluated in sequence, and if any stopping conditions are met, then segmentation fails 197 and the initial mask is returned. These stopping criterion include determinations of whether the mask too small 190, if the mask too large 192, has the maximum number of iterations been reached 194, and has a running time criterion been reached/exceeded 196. If none of the stopping criterion are met, then the process continues, after first checking 198 if the process has been canceled. If the process is canceled 200, then a clean up is performed and an exit made, otherwise a return is made to step 174 at the top of the loop.

3. Results of Semi-Automatic Segmentation

Figures 7A, 7B, 7C:
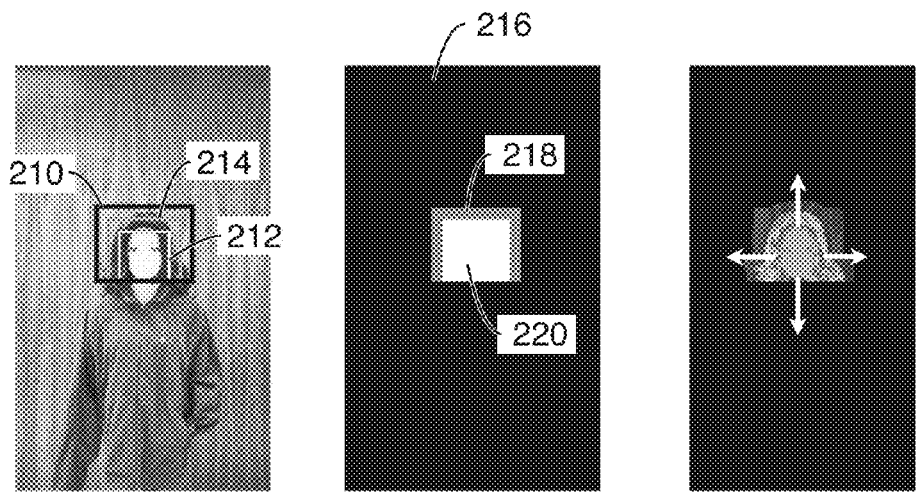
FIG. 7A through FIG. 7F are images detailing steps in the semi-automatic image segmentation process according to an embodiment of the present disclosure.
Figures 7D, 7E, 7F:

FIG. 7A through FIG. 7F illustrate an example of semi-automatic segmentation for human objects according to the present disclosure. In FIG. 7A a first step is seen with selection of an initial background 210 for the human object. Then in response to face detection a box is drawn around the face 212, and around the hair region 214 for the background region. In FIG. 7B a second step is seen generating an initial binary segmentation mask where gray 218 is the background, white 220 is the face and the hair area (the foreground), while the black area 216 is outside of the region of interest. In FIG. 7C a third step is seen refining the initial binary segmentation mask using the joint Bayes classifier (JBC) of the present disclosure. The region of interest (ROI) is seen being expanded left, right, upward, and downward, where/when the foreground regions reaches, or comes too close to the edge of the current ROI. The expanded object area is seen in FIG. 7D, which itself can be expanded further. In FIG. 7E is seen a fourth step in which segmentation ends when one of the stopping criterion is satisfied. FIG. 7F depicts a generated object mask for separating a human object in response to binarizing the estimated segmentation mask.

4. Application Areas

As described above, the semi-automatic segmentation process of the disclosure can be applied within digital cameras, or other computer devices configured for processing images. The function that computes the histogram contrast is utilized in the disclosed segmentation implementation. The depth is estimated by a separate application, and if depth information is not available, at least one embodiment of the present disclosure proceeds to estimate the object mask without depth information. Aside from segmenting objects from the background, or the background from the selected object, the present disclosure can be utilized in other applications, such as in the fields of video surveillance, and machine vision in the robotics industry.

5. Method Steps Executed on a Computer Processor

The enhancements described in the presented technology can be readily implemented within various image processing systems. In particular, the processing overhead requirements are sufficiently low to allow the method to be performed within a digital camera device, or cellular phone device, having a display and user interface. It should also be appreciated that digital cameras and cellular phones, along with other image processing devices are preferably implemented to include one or more computer processor devices (e.g., CPU, microprocessor, microcontroller, computer enabled ASIC, etc.) and associated memory (e.g., RAM, DRAM, NVRAM, FLASH, computer readable media, etc.) whereby programming stored in the memory and executable on the processor perform the steps of the various process methods described herein. The presented technology is non-limiting with regard to memory and computer-readable media, insofar as these are non-transitory, and thus not constituting a transitory electronic signal.

Embodiments of the present invention may be described with reference to flowchart illustrations of methods and systems according to embodiments of the invention, and/or algorithms, formulae, or other computational depictions, which may also be implemented as computer program products. In this regard, each block or step of a flowchart, and combinations of blocks (and/or steps) in a flowchart, algorithm, formula, or computational depiction can be implemented by various means, such as hardware, firmware, and/or software including one or more computer program instructions embodied in computer-readable program code logic. As will be appreciated, any such computer program instructions may be loaded onto a computer, including without limitation a general purpose computer or special purpose computer, or other programmable processing apparatus to produce a machine, such that the computer program instructions which execute on the computer or other programmable processing apparatus create means for implementing the functions specified in the block(s) of the flowchart(s).

Accordingly, blocks of the flowcharts, algorithms, formulae, or computational depictions support combinations of means for performing the specified functions, combinations of steps for performing the specified functions, and computer program instructions, such as embodied in computer-readable program code logic means, for performing the specified functions. It will also be understood that each block of the flowchart illustrations, algorithms, formulae, or computational depictions and combinations thereof described herein, can be implemented by special purpose hardware-based computer systems which perform the specified functions or steps, or combinations of special purpose hardware and computer-readable program code logic means.

Furthermore, these computer program instructions, such as embodied in computer-readable program code logic, may also be stored in a computer-readable memory that can direct a computer or other programmable processing apparatus to function in a particular manner, such that the instructions stored in the computer-readable memory produce an article of manufacture including instruction means which implement the function specified in the block(s) of the flowchart(s). The computer program instructions may also be loaded onto a computer or other programmable processing apparatus to cause a series of operational steps to be performed on the computer or other programmable processing apparatus to produce a computer-implemented process such that the instructions which execute on the computer or other programmable processing apparatus provide steps for implementing the functions specified in the block(s) of the flowchart(s), algorithm(s), formula(e), or computational depiction(s).

It will further be appreciated that "programming" as used herein refers to one or more instructions that can be executed by a processor to perform a function as described herein. The programming can be embodied in software, in firmware, or in a combination of software and firmware. The programming can be stored local to the device in non-transitory media, or can be stored remotely such as on a server, or all or a portion of the programming can be stored locally and remotely. Programming stored remotely can be downloaded (pushed) to the device by user initiation, or automatically based on one or more factors. It will further be appreciated that as used herein, that the terms processor, central processing unit (CPU), and computer are used synonymously to denote a device capable of executing the programming and communication with input/output interfaces and/or peripheral devices.

From the description herein, it will be appreciated that the present disclosure encompasses multiple embodiments which include, but are not limited to, the following:

1. A apparatus for semi-automatically segmenting an image object from the remainder of the image, comprising: (a) a processor configured for image processing of captured color digital images and receiving a user selection input as a user selected location within said color image for identifying an object to which segmentation is to be applied; (b) a memory storing instructions; and (c) said instructions when executed by the processor performing segmenting of the object as a foreground from its background in said color image, comprising: (c)(i) downscaling said color image at the start of segmenting the object, and selecting one or more finer resolutions as segmentation proceeds; (c)(ii) performing expectation-maximization (EM) with a joint Bayes classifier for classifying nearby pixels as foreground or background, and simultaneously estimating class parameters and an object mask for the object, in response to utilizing pixel color values for each pixel; (c)(iii) performing a binary search for determining a best size of an initial mask while performing said segmenting of the object, and checking stopping criteria during said segmenting of the object, with successful segmentation being completed in response to EM convergence; and (d) generating an object mask for the object.

2. The apparatus of any preceding embodiment, wherein said instructions when executed by the processor are configured for performing segmentation for separating the image object of the foreground from the background.

3. The apparatus of any preceding embodiment, wherein said instructions when executed by the processor are configured for performing expectation-maximization (EM) with a joint Bayes classifier in response to further information comprising depth information, or histogram contrast information, or a combination thereof.

4. The apparatus of any preceding embodiment, said instructions when executed by the processor are further configured for performing a pre-segmentation process when the image object is a known object having known properties that are used to discern at least a portion of the known object from the background.

5. The apparatus of any preceding embodiment, wherein said known object is a human having human object properties.

6. The apparatus of any preceding embodiment, wherein said instructions when executed by the processor are configured for utilizing said human object properties in a face detection process to aid in pre-segmenting the human object from the background.

7. The apparatus of any preceding embodiment, wherein said instructions when executed by the processor are configured for performing said pre-segmentation by generating an initial foreground mask for each detected face along with a boundary determined for a hair part around each detected face, and another boundary determined beyond the hair boundary as an initial background region.

8. The apparatus of any preceding embodiment, wherein said instructions when executed by the processor are configured for performing said segmentation of the image based on said user selected location for identifying the object to which segmentation is to be applied, and does not require the user to input, or otherwise define, a size for the object or a boundary surrounding the object.

9. The apparatus of any preceding embodiment, wherein said instructions when executed by the processor are configured for performing expectation-maximization (EM) with a joint Bayes classifier by estimating optimal adaptive class number for foreground and/or background pixels based on mean square errors, and performs quantizing foreground and/or background pixels by a quantizer to generate initial classes for foreground and/or background regions, from which a confidence map is generated indicating how close the foreground pixels are to closest background class, with evaluation and updating of class parameters based on current classes (E-step), followed by pixels evaluated using a joint Bayes classifier to classify pixels at evaluation points (M-step).

10. The apparatus of any preceding embodiment, said instructions when executed by the processor are configured for performing said segmentation based on said user selected location which comprises a touch input on a screen upon which said color image is displayed.

11. A apparatus for semi-automatically segmenting an image object from the remainder of the image, comprising: (a) a processor configured for image processing of captured color digital images and receiving a user selection input as a user selected location within said color image for identifying an object to which segmentation is to be applied; (b) a memory storing instructions; and (c) said instructions when executed by the processor performing segmenting of the object as a foreground from its background in said color image, comprising: (c)(i) downscaling said color image at the start of segmenting the object, and selecting one or more finer resolutions as segmentation proceeds; (c)(ii) performing expectation-maximization (EM) with a joint Bayes classifier for classifying pixels nearby said user selected location as foreground or background, and simultaneously estimating class parameters and an object mask for the object, in response to utilizing pixel color values, depth, and histogram contrast for each pixel; (c)(iii) performing a binary search for determining a best size of an initial mask while performing said segmenting of the object, and checking stopping criteria during said segmenting of the object, with successful segmentation being completed in response to EM convergence; and (d) generating an object mask for the object as selected by the user.

12. The apparatus of any preceding embodiment, said instructions when executed by the processor are further configured for performing a pre-segmentation process when the image object is a known object having known properties that are used to discern at least a portion of the known object from background pixels.

13. The apparatus of any preceding embodiment, wherein said known object is a human having human object properties.

14. The apparatus of any preceding embodiment, wherein said instructions when executed by the processor are configured for utilizing said human object properties in a face detection process to aid in pre-segmenting the human object from the background.

15. The apparatus of any preceding embodiment, wherein said instructions when executed by the processor are configured for performing said pre-segmentation by generating an initial foreground mask for each detected face along with a boundary determined for a hair part around each detected face, and another boundary determined beyond the hair boundary as an initial background region.

16. The apparatus of any preceding embodiment, wherein said instructions when executed by the processor are configured for performing said segmentation of the image based on said user selected location for identifying the object to which segmentation is to be applied, and does not require the user to input, or otherwise define, a size for the object or a boundary surrounding the object.

17. The apparatus of any preceding embodiment, wherein said instructions when executed by the processor are configured for performing expectation-maximization (EM) with a joint Bayes classifier by estimating optimal adaptive class number for foreground and/or background pixels based on mean square errors, and quantizing the foreground and/or background pixels by a quantizer to generate initial classes for foreground and/or background regions, from which a confidence map is generated indicating how close the foreground pixels are to a closest background class, with evaluation and updating of class parameters based on current classes (E-step), followed by pixels evaluated using a joint Bayes classifier to classify pixels at evaluation points (M-step).

18. The apparatus of any preceding embodiment, said instructions when executed by the processor are configured for performing said segmentation based on said user selected location which comprises a touch input on a screen upon which said color image is displayed.

19. A method of semi-automatically segmenting an image object from the remainder of the image, comprising the steps of: (a) receiving a color image within an image processing device configured for performing image processing functions; (b) receiving a user selection input as a user selected location within said color image for identifying an object to which segmentation is to be applied; (c) segmenting the object as a foreground from its background in said color image, comprising: (c)(i) downscaling said color image at the start of segmenting the object, and selecting one or more finer resolutions as segmentation proceeds; (c)(ii) estimating size, shape, and the number of colors of the object which is proximal, or surrounding, the user-selected location, and deciding which region nearby pixels belong to, either the foreground or the background; (c)(iii) performing expectation-maximization (EM) with a joint Bayes classifier for classifying nearby pixels as foreground or background, and simultaneously estimating class parameters and an object mask for the object; (c)(iv) performing a binary search for determining a best size of an initial circular mask while performing said segmenting of the object, and checking stopping criteria during said segmenting of the object, with successful segmentation being completed in response to EM convergence; and (d) generating an object mask for the object as selected by the user.

20. The method of any preceding embodiment, wherein said segmentation is configured for separating the image object of the foreground from the background.

21. The method of any preceding embodiment, further comprising utilizing depth information, or histogram contrast information, or a combination thereof, for each pixel when performing segmentation to discern the foreground from the background toward increasing segmentation accuracy.

22. The method of any preceding embodiment, wherein said image object is a known object having known properties which are utilized in a pre-segmentation process which discerns at least a portion of the known object from background pixels.

23. The method of any preceding embodiment, wherein said known object is a human having human object properties.

24. The method of any preceding embodiment, wherein a face detection process is utilized to aid in pre-segmenting the human object from the background.

25. The method of any preceding embodiment, further comprising performing a pre-segmentation process if the object is a human object with an initial foreground mask generated for each detected face along with a boundary determined for a hair part around each detected face, and another boundary determined beyond the hair boundary as an initial background region.

26. The method of any preceding embodiment, wherein said user selected location within said color image for identifying an object to which segmentation is to be applied, does not require the user to input, or otherwise define, a size for the object or a boundary surrounding the object.

27. The method of any preceding embodiment, wherein during performing expectation-maximization (EM) with a joint Bayes classifier estimates are made of optimal adaptive class number for foreground and/or background pixels based on mean square errors, and quantizing is performed on foreground and/or background pixels by a quantizer to generate initial classes for foreground and/or background regions, from which a confidence map is generated indicating how close the foreground pixels are to closest background class, with evaluation and updating of class parameters based on current classes (E-step), followed by pixels evaluated using a joint Bayes classifier to classify pixels at evaluation points (M-step).

28. The method of any preceding embodiment, wherein said user selected location comprises a touch input on a screen upon which said color image is displayed.

Although the description herein contains many details, these should not be construed as limiting the scope of the disclosure but as merely providing illustrations of some of the presently preferred embodiments. Therefore, it will be appreciated that the scope of the disclosure fully encompasses other embodiments which may become obvious to those skilled in the art.

In the claims, reference to an element in the singular is not intended to mean "one and only one" unless explicitly so stated, but rather "one or more." All structural and functional equivalents to the elements of the disclosed embodiments that are known to those of ordinary skill in the art are expressly incorporated herein by reference and are intended to be encompassed by the present claims. Furthermore, no element, component, or method step in the present disclosure is intended to be dedicated to the public regardless of whether the element, component, or method step is explicitly recited in the claims. No claim element herein is to be construed as a "means plus function" element unless the element is expressly recited using the phrase "means for". No claim element herein is to be construed as a "step plus function" element unless the element is expressly recited using the phrase "step for".

What is claimed is:

1. An apparatus for semi-automatically segmenting an image object from the remainder of the image, comprising:
    (a) a processor configured for image processing of captured color digital images and receiving a user selection input as a user selected location within a color image from said captured color digital images for identifying an object to which segmentation is to be applied; and
    (b) a memory storing instructions;
    (c) said instructions when executed by the processor performing segmenting of the object as a foreground from its background in said color image, comprising:
        (i) downscaling said color image into a downscaled color image at the start of segmenting the object, and selecting one or more finer resolutions as segmentation proceeds;
        (ii) performing expectation-maximization (EM) with a joint Bayes classifier for classifying pixels nearby the user selected location for identifying an object to which segmentation is to be applied in the downscaled color image as foreground or background, and simultaneously estimating class parameters and an object mask for the object, in response to utilizing pixel color values for each pixel;
        (iii) refining the object mask by performing a binary search for determining a best size of an initial mask while performing said segmenting of the object at finer resolutions, and checking stopping criteria during said segmenting of the object, with successful segmentation being completed in response to EM convergence; and
        (iv) generating an object mask for the object as a result of said binary search.

2. The apparatus as recited in claim 1, wherein said instructions when executed by the processor are configured for performing segmentation for separating the image object of the foreground from the background.

3. The apparatus as recited in claim 1, wherein said instructions when executed by the processor are configured for performing expectation-maximization (EM) with a joint Bayes classifier in response to further information comprising depth information, or histogram contrast information, or a combination thereof.

4. The apparatus as recited in claim 1, said instructions when executed by the processor are further configured for performing a pre-segmentation process when the image object is a known object having known properties that are used to discern at least a portion of the known object from the background.

5. The apparatus as recited in claim 4, wherein said known object is a human having human object properties.

6. The apparatus as recited in claim 5, wherein said instructions when executed by the processor are configured for utilizing said human object properties in a face detection process to aid in pre-segmenting the human object from the background.

7. The apparatus as recited in claim 6, wherein said instructions when executed by the processor are configured for performing said pre-segmentation by generating an initial foreground mask for each detected face along with a boundary determined for a hair part around each detected face, and another boundary determined beyond the hair boundary as an initial background region.

8. The apparatus as recited in claim 1, wherein said instructions when executed by the processor are configured for performing said segmentation of the image based on said user selected location for identifying the object to which segmentation is to be applied, and does not require the user to input, or otherwise define, a size for the object or a boundary surrounding the object.

9. The apparatus as recited in claim 1, wherein said instructions when executed by the processor are configured for performing expectation-maximization (EM) with a joint Bayes classifier by estimating optimal adaptive class number for foreground and/or background pixels based on mean square errors, and performs quantizing foreground and/or background pixels by a quantizer to generate initial classes for foreground and/or background regions, from which a confidence map is generated indicating how close the foreground pixels are to closest background class, with evaluation and updating of class parameters based on current classes (E-step), followed by pixels evaluated using a joint Bayes classifier to classify pixels at evaluation points (M-step).

10. The apparatus as recited in claim 1, said instructions when executed by the processor are configured for performing said segmentation based on said user selected location which comprises a touch input on a screen upon which said color image is displayed.

11. An apparatus for semi-automatically segmenting an image object from the remainder of the image, comprising:
(a) a processor configured for image processing of captured color digital images and receiving a user selection input as a user selected location within a color image from said captured color digital images for identifying an object to which segmentation is to be applied; and
(b) a memory storing instructions;
(c) said instructions when executed by the processor performing segmenting of the object as a foreground from its background in said color image, comprising:
(i) downscaling said color image into a downscaled color image at the start of segmenting the object, and selecting one or more finer resolutions as segmentation proceeds;
(ii) performing expectation-maximization (EM) with a joint Bayes classifier for classifying pixels nearby said user selected location for identifying an object to which segmentation is to be applied in the downscaled color image as foreground or background, and simultaneously estimating class parameters and an object mask for the object, in response to utilizing pixel color values, depth, and histogram contrast for each pixel;
(iii) refining the object mask by performing a binary search for determining a best size of an initial mask while performing said segmenting of the object at finer resolutions, and checking stopping criteria during said segmenting of the object, with successful segmentation being completed in response to EM convergence; and
(iv) generating an object mask for the object as selected by the user as a result of said binary search.

12. The apparatus as recited in claim 11, said instructions when executed by the processor are further configured for performing a pre-segmentation process when the image object is a known object having known properties that are used to discern at least a portion of the known object from background pixels.

13. The apparatus as recited in claim 12, wherein said known object is a human having human object properties.

14. The apparatus as recited in claim 13, wherein said instructions when executed by the processor are configured for utilizing said human object properties in a face detection process to aid in pre-segmenting the human object from the background.

15. The apparatus as recited in claim 14, wherein said instructions when executed by the processor are configured for performing said pre-segmentation by generating an initial foreground mask for each detected face along with a boundary determined for a hair part around each detected face, and another boundary determined beyond the hair boundary as an initial background region.

16. The apparatus as recited in claim 11, wherein said instructions when executed by the processor are configured for performing said segmentation of the image based on said user selected location for identifying the object to which segmentation is to be applied, and does not require the user to input, or otherwise define, a size for the object or a boundary surrounding the object.

17. The apparatus as recited in claim 11, wherein said instructions when executed by the processor are configured for performing expectation-maximization (EM) with a joint Bayes classifier by estimating optimal adaptive class number for foreground and/or background pixels based on mean square errors, and quantizing the foreground and/or background pixels by a quantizer to generate initial classes for foreground and/or background regions, from which a confidence map is generated indicating how close the foreground pixels are to a closest background class, with evaluation and updating of class parameters based on current classes (E-step), followed by pixels evaluated using a joint Bayes classifier to classify pixels at evaluation points (M-step).

18. The apparatus as recited in claim 11, said instructions when executed by the processor are configured for performing said segmentation based on said user selected location which comprises a touch input on a screen upon which said color image is displayed.

19. A method of semi-automatically segmenting an image object from the remainder of the image, comprising the steps of:
(a) receiving a color image within an image processing device configured for performing image processing functions;
(b) receiving a user selection input as a user selected location within said color image for identifying an object to which segmentation is to be applied;
(c) segmenting the object as a foreground from its background in said color image, comprising:
(i) downscaling said color image into a downscaled color image at the start of segmenting the object, and selecting one or more finer resolutions as segmentation proceeds;
(ii) estimating size, shape, and the number of colors of the object which is proximal, or surrounding, the user-selected location, and deciding which region nearby pixels belong to, either the foreground or the background;
(iii) performing expectation-maximization (EM) with a joint Bayes classifier for classifying pixels nearby the user selected location for identifying an object to which segmentation is to be applied in the downscaled color image as foreground or background, and simultaneously estimating class parameters and an object mask for the object; and
(iv) refining the object mask by performing a binary search for determining a best size of an initial circular mask while performing said segmenting of the object at finer resolutions, and checking stopping criteria during said segmenting of the object, with successful segmentation being completed in response to EM convergence; and
(v) generating an object mask for the object as selected by the user as a result of said binary search.

20. The method as recited in claim 19, wherein said segmentation is configured for separating the image object of the foreground from the background.

21. The method as recited in claim 19, further comprising utilizing depth information, or histogram contrast information, or a combination thereof, for each pixel when performing segmentation to discern the foreground from the background toward increasing segmentation accuracy.

22. The method as recited in claim 19, wherein said image object is a known object having known properties which are utilized in a pre-segmentation process which discerns at least a portion of the known object from background pixels.

23. The method as recited in claim 22, wherein said known object is a human having human object properties.

24. The method as recited in claim 23, wherein a face detection process is utilized to aid in pre-segmenting the human object from the background.

25. The method as recited in claim 19, further comprising performing a pre-segmentation process if the object is a human object with an initial foreground mask generated for each detected face along with a boundary determined for a hair part around each detected face, and another boundary determined beyond the hair boundary as an initial background region.

26. The method as recited in claim 19, wherein said user selected location within said color image for identifying an object to which segmentation is to be applied, does not require the user to input, or otherwise define, a size for the object or a boundary surrounding the object.

27. The method as recited in claim 19, wherein during performing expectation-maximization (EM) with a joint Bayes classifier estimates are made of optimal adaptive class number for foreground and/or background pixels based on mean square errors, and quantizing is performed on foreground and/or background pixels by a quantizer to generate initial classes for foreground and/or background regions, from which a confidence map is generated indicating how close the foreground pixels are to closest background class, with evaluation and updating of class parameters based on current classes (E-step), followed by pixels evaluated using a joint Bayes classifier to classify pixels at evaluation points (M-step).

28. The method as recited in claim 19, wherein said user selected location comprises a touch input on a screen upon which said color image is displayed.

\* \* \* \* \*